(12) United States Patent
Wu et al.

(10) Patent No.: US 11,853,618 B2
(45) Date of Patent: Dec. 26, 2023

(54) METHOD, ELECTRONIC DEVICE, AND COMPUTER PRODUCT FOR RAID RECONSTRUCTION

(71) Applicant: EMC IP Holding Company LLC, Hopkinton, MA (US)

(72) Inventors: Qian Wu, Chengdu (CN); Bo Hu, Chengdu (CN); Jing Ye, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 17/528,551

(22) Filed: Nov. 17, 2021

(65) Prior Publication Data

US 2022/0342611 A1    Oct. 27, 2022

(30) Foreign Application Priority Data

Apr. 22, 2021    (CN) .......................... 202110436956.6

(51) Int. Cl.
*G06F 11/00* (2006.01)
*G06F 3/06* (2006.01)
*G06F 11/10* (2006.01)

(52) U.S. Cl.
CPC .......... *G06F 3/0689* (2013.01); *G06F 3/0613* (2013.01); *G06F 3/0619* (2013.01); *G06F 3/0656* (2013.01); *G06F 3/0659* (2013.01); *G06F 11/1076* (2013.01)

(58) Field of Classification Search
CPC .................................................. G06F 11/1076
See application file for complete search history.

(56) References Cited

U.S. PATENT DOCUMENTS

| 8,006,128 | B2 | 8/2011 | Olster | |
|---|---|---|---|---|
| 10,983,862 | B2 | 4/2021 | Armangau et al. | |
| 2004/0059958 | A1* | 3/2004 | Umberger | G06F 11/1092 711/158 |
| 2006/0156059 | A1* | 7/2006 | Kitamura | G06F 11/1092 714/6.21 |
| 2014/0215147 | A1 | 7/2014 | Pan | |
| 2019/0129795 | A1* | 5/2019 | Xu | G06F 11/1088 |
| 2021/0157695 | A1 | 5/2021 | Tal | |

* cited by examiner

*Primary Examiner* — Philip Guyton
(74) *Attorney, Agent, or Firm* — BainwoodHuang (57) ABSTRACT

Techniques for RAID reconstruction involve: determining, from a task list, multiple stripes in a RAID that are involved in a to-be-processed task within a current task window, the task list including an external I/O request task and an internal reconstruction I/O request task, and each stripe including data on a first number of data disks and data on a second number of parity disks; reading data from the multiple stripes into a read buffer; and if data of the first number of data disks in a stripe among the multiple stripes has already been read into the read buffer, performing the internal reconstruction I/O request task on the stripe. Such a technique helps to increase the processing power and efficiency of the data storage system to recover the reconstruction of RAID stripes while coping with external I/O requests.

18 Claims, 8 Drawing Sheets

METHOD, ELECTRONIC DEVICE, AND COMPUTER PRODUCT FOR RAID RECONSTRUCTION

CROSS-REFERENCE TO RELATED APPLICATION

This application claims priority to Chinese Patent Application No. CN202110436956.6, on file at the China National Intellectual Property Administration (CNIPA), having a filing date of Apr. 22, 2021 and having "METHOD, ELECTRONIC DEVICE, AND COMPUTER PRODUCT FOR RAID RECONSTRUCTION" as a title, the contents and teachings of which are herein incorporated by reference in their entirety.

TECHNICAL FIELD

Embodiments of the present disclosure relate to the field of data storage, and more particularly, to a method, an electronic device, and a computer program product for RAID reconstruction.

BACKGROUND

With the development of data storage technology, people have higher and higher requirements for the performance and reliability of data storage devices. Redundant Array of Independent Disks (RAID) is the combination of multiple independent physical disks in accordance with different data organization methods to form a disk group (i.e., logical disk), which, as an array with redundancy capability, provides higher storage performance and reliability than a single disk. Each physical disk in a RAID can also be referred to as a member disk of the RAID, where the member disks can include data disks and parity disks. In order to recover data in the event of a disk failure in a RAID, it is common to set one parity information block (e.g., RAID 1, RAID 3, or RAID 5) or multiple parity information blocks (e.g., RAID 6) in the RAID.

In the above RAID reconstruction process, if there is a data read or data write operation (e.g., external I/O request) to the disk array RAID, the data read or data write operation will generally be given a higher priority, so the data read or data write operation will be processed first, and the RAID reconstruction will then be performed when system resources are idle, thus resulting in a very slow RAID reconstruction. In the conventional reconstruction method, if an internal reconstruction I/O request is interrupted by an external I/O request, the head will move to the corresponding position to process the external I/O request, and after responding to the external I/O request, the head moves to the position where the previous reconstruction ended to continue the reconstruction. Therefore, if such external I/O requests occur very frequently, the head will have to move back and forth, which greatly reduces the speed of reconstruction and thus leads to lower reliability of the data storage system.

SUMMARY OF THE INVENTION

Embodiments of the present disclosure provide an improved solution for RAID reconstruction in data storage systems.

In a first aspect of the present disclosure, a method for RAID reconstruction is provided. The method includes: determining, from a task list, multiple stripes in a RAID that are involved in a to-be-processed task within a current task window, the task list including an external I/O request task and an internal reconstruction I/O request task, and each stripe including data on a first number of data disks and data on a second number of parity disks; reading data from the multiple stripes into a read buffer; and if data of the first number of data disks in a stripe among the multiple stripes has already been read into the read buffer, performing the internal reconstruction I/O request task on the stripe.

In a second aspect of the present disclosure, an electronic device is provided. The electronic device includes a processor and a memory coupled to the processor, the memory storing instructions that need to be executed, wherein the instructions, when executed by the processor, cause the device to perform actions including: determining, from a task list, multiple stripes in a RAID that are involved in a to-be-processed task within a current task window, the task list including an external I/O request task and an internal reconstruction I/O request task, and each stripe including data on a first number of data disks and data on a second number of parity disks; reading data from the multiple stripes into a read buffer; and if data of the first number of data disks in a stripe among the multiple stripes has already been read into the read buffer, performing the internal reconstruction I/O request task on the stripe.

In a third aspect, a computer program product is provided. The computer program product is tangibly stored on a computer-readable medium and includes computer-executable instructions that, when executed, cause a device to perform the method of the first aspect.

The Summary of the Invention is provided to introduce the selection of concepts in a simplified form, which will be further described in the Detailed Description below. The Summary of the Invention is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

In embodiments of the present disclosure, the term "disk" denotes non-volatile memory for persistent data retention. Examples of disks include, but are not limited to, hard disk drives (HDDs), optical disk drives, and solid state drives (SSDs), among others.

Functionally, RAIDs can be classified into RAID level 1 to RAID level 10, etc., for example: RAID 0, RAID 1, RAID 2, RAID 3, RAID 4, and RAID 5. Each of these RAID levels has its own strengths and weaknesses. Taking RAID 5 as an example, in a conventional RAID, RAID 5 can include, for example, 5 disks. RAID 5 consists of block-level stripes with distributed parity information, wherein the parity information can be distributed across multiple disks, and each stripe can include 5 segments, i.e., 4 data segments (also called data disks) and 1 parity information segment (also called parity disk) (i.e., "4D+1P"). When a disk in the RAID fails, subsequent reads can be calculated using the distributed parity information, thus allowing data to be recovered and not lost. At the same time, a hot idle disk, or hot spare disk, will be selected to replace the failed disk and all data on the failed disk will be reconstructed and written to the hot spare disk.

As previously described, in the RAID reconstruction process, if there is a data read or data write operation (e.g., external I/O request) to the disk array RAID, the data read or data write operation will generally be given a higher priority, so the data read or data write operation will be processed first, and the RAID reconstruction will then be performed when system resources are idle, thus resulting in a very slow RAID reconstruction. In the conventional reconstruction method, if an internal reconstruction I/O request is interrupted by an external I/O request, the head will move to the corresponding position to process the external I/O request, and after responding to the external I/O request, the head moves to the position where the previous reconstruction ended to continue the reconstruction. Therefore, if such external I/O requests occur very frequently, the head will have to move back and forth, which greatly reduces the speed of reconstruction and thus leads to lower reliability of the data storage system. In order to make the data storage system more reliable and stable, the hope is to improve the efficiency of disk array reconstruction with as little impact as possible on the performance of the data storage system.

Figure 1:
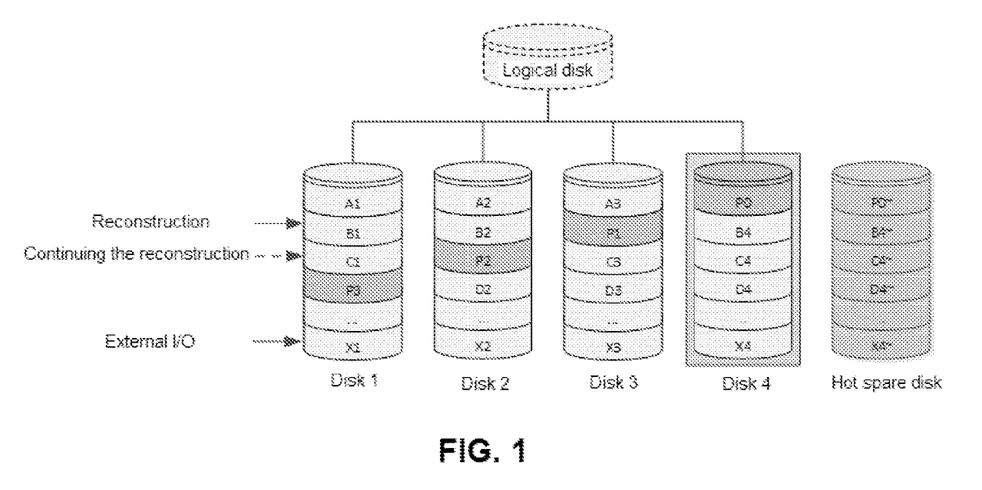
FIG. 1 illustrates a schematic diagram of the conventional RAID 5 reconstruction process.

The conventional RAID reconstruction method will be described below with reference to FIG. 1. FIG. 1 illustrates a schematic diagram of the conventional RAID 5 reconstruction process. In FIG. 1, assuming that the system is currently processing the reconstruction of stripe B, if there is a new external I/O request at stripe X, the system will have to move the head to stripe X to process that external I/O request. When the processing of that external I/O request is completed, the head will need to move back to the vicinity of stripe B, for example, stripe C, to continue the reconstruction. As can be seen, if such external I/O requests occur very frequently, the head will have to move back and forth, thus greatly reducing the speed of the reconstruction. It should be understood that while FIG. 1 illustrates the reconstruction process using RAID 5 as an example, the reconstruction process for other types of RAID structures is similar.

Embodiments of the present disclosure propose a new coping mechanism for reducing head movement that is used to perform internal reconstruction I/O requests against contiguous address spaces when processing external I/O requests. Based on the following understanding, the so-called distributed multi-process reconstruction method is proposed herein: the reconstruction process can be implemented in a non-contiguous manner and can be processed in parallel using multiple threads. Generally speaking, the physical addresses to which the logically contiguous address spaces are mapped are also contiguous. In the technical solution herein, a circular task list (TCL) and an I/O request list (IRL) are introduced to help implement the distributed multi-process reconstruction method.

According to embodiments of the present disclosure, the high frequency of external I/O requests results in the formation of a disk landing zone corresponding to the current external I/O request. The technical solution of the present disclosure achieves improved overall performance of the reconstruction by calculating hotspot zones and performing reconstruction on the stripes in the vicinity of the hotspot zones to reduce long distance movements of the head back and forth between stripes. By reducing the distance of movement of the head, the head does not have to move back to the position where the previous reconstruction ended or was paused, but continues the reconstruction in the vicinity of the hotspot zones corresponding to the external I/O. At the same time, the technical solution of the present disclosure can greatly reduce the reconstruction time compared to the conventional RAID reconstruction, and therefore improve the reliability of RAID. In addition, since data reads or writes of external applications are concentrated in the vicinity of the hotspot zones, and the reconstruction of RAID is also concentrated in the vicinity of the hotspot zones, this will also improve the performance of external I/O.

The example embodiments of the present disclosure will be described in detail below with reference to the accompanying drawings.

Figure 2:
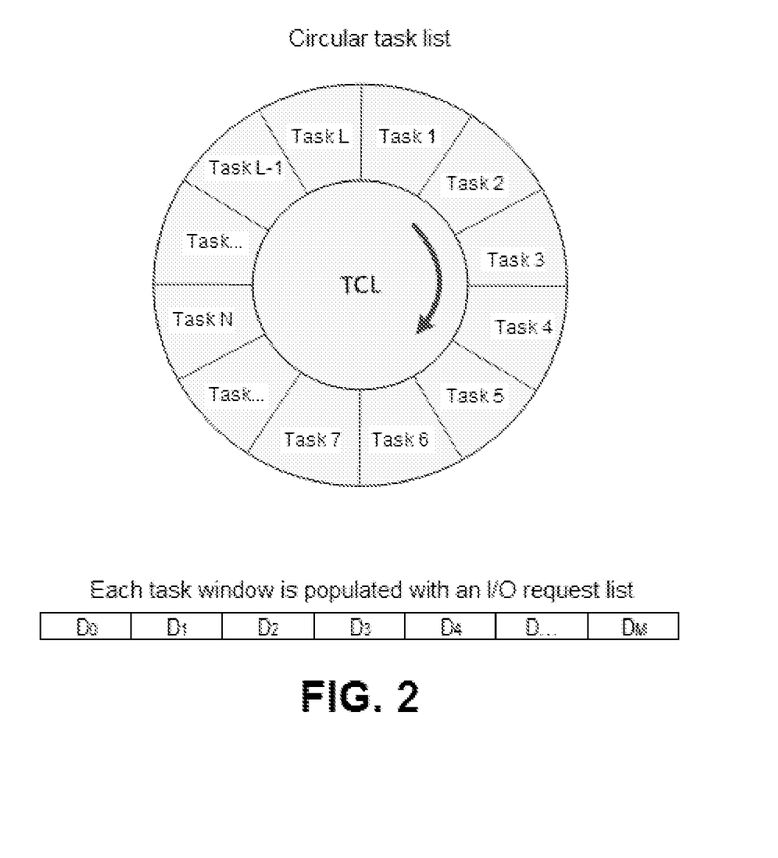
FIG. 2 illustrates a general schematic diagram of a data structure in which I/O requests are arranged in the form of a task list according to embodiments of the present disclosure.

FIG. 2 illustrates a general schematic diagram of a data structure in which I/O requests are arranged in the form of a task list according to embodiments of the present disclosure. It should be understood that the data structure for I/O requests of embodiments of the present disclosure can also be applied to other data storage systems that need to be reconstructed. In addition, the data structure of arranging I/O requests of embodiments of the present disclosure can also be replaced with other data structures, for example, a non-circular data structure.

In FIG. 2, I/O requests from external applications and internal reconstruction I/O requests are arranged into a circular task list (TCL), where one TCL is divided into multiple task windows and is executed in sequence. According to embodiments of the present disclosure, the TCL is a circular data structure in memory, which is assumed to be pre-defined in L units, i.e., L task windows. In FIG. 2, there is typically one I/O request list, IRL, populated in each task unit or task window. One IRL typically implies a series of contiguous I/O data blocks, and this series of contiguous I/O data blocks is a data structure that will be executed in sequence by the reconstruction manager. In embodiments of the present disclosure, whether a particular task window is populated with reconstruction I/O requests or external I/O requests depends on whether a hotspot or hotspot zone is detected.

Assuming that the maximum length of the IRL list is M, it is often the case that candidate data blocks will not fill up the maximum length of the IRL list because there are not enough hot data blocks or external I/O data blocks. However, if a certain external I/O data block exceeds the maximum length of the IRL list, the remaining data blocks will be stored in the task window that follows. The method of generating an IRL list will be described in more detail below with reference to FIG. 4.

According to embodiments of the present disclosure, when RAID reconstruction is triggered, a TCL task list is automatically created and the data storage system allocates memory space to each unit, i.e., task window, in the TCL. Since it is mainly the reconstruction I/O requests that are processed when RAID reconstruction is triggered, the task window of the TCL list is mainly populated with reconstruction I/O requests. In other words, the initialization of the TCL list involves allocating the first K task windows of the TCL list to reconstruction I/O requests, while the remaining L-K task windows are reserved for external I/O requests. Thereafter, when a new external I/O request occurs, the task scheduler will populate a task window with the cached external I/O request and inserts the task window containing the external I/O request before the task windows containing the reconstruction I/O requests to prioritize the processing of the external I/O request. The process of populating the TCL task window will be described in more detail below, with reference to method 300 of FIG. 3.

It should be understood that in the technical solution of the present disclosure, the TCL task list and the IRL list are introduced to arrange external I/O requests and reconstruction I/O requests in the form of a list of to-be-processed tasks, so that the data storage system can automatically process I/O request tasks in a specific manner, and other forms of arrangement for I/O requests should also be included in the technical solution of the present disclosure and are not limited to the TCL task list and IRL list presented here.

Figure 3:
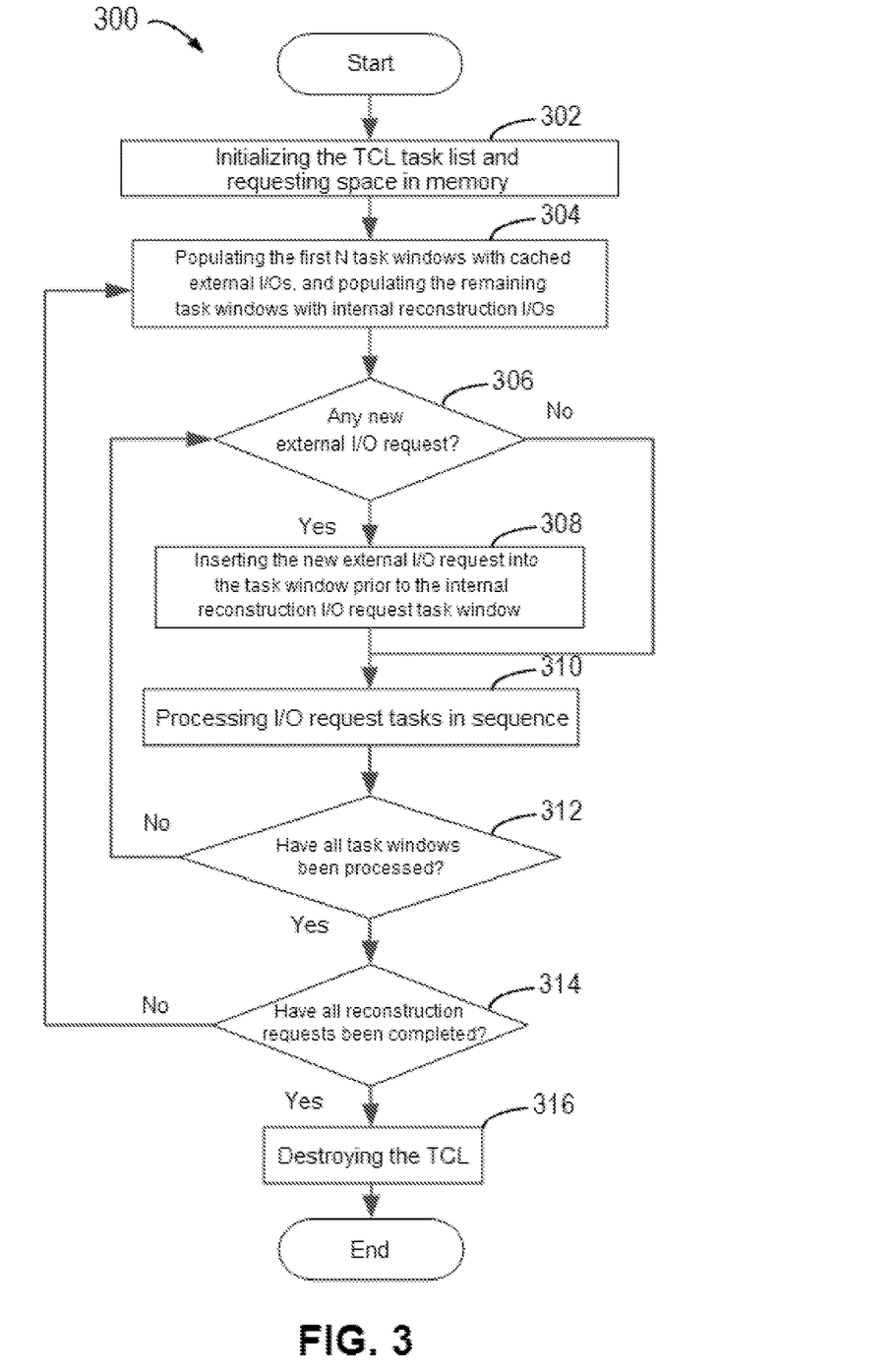
FIG. 3 illustrates a flow chart of a method for populating a TCL task list according to embodiments of the present disclosure.

FIG. 3 illustrates a flow chart of a method for populating a TCL task list according to embodiments of the present disclosure. It should be understood that the process of populating the TCL task list is completed prior to the distributed multi-process reconstruction (DMPR) process that will be described below.

At block 302, after a reconstruction I/O request is triggered, a TCL task list is automatically created and a data storage system allocates memory space to each unit in the TCL, thus completing the initialization of the TCL list. At block 304, the devices in the data storage system at this time need to process the cached external I/O requests, which are pre-populated in the first N task windows of the TCL task list, and the remaining task windows are populated with reconstruction I/O requests. At block 306, if new external I/O requests occur, the process proceeds to block 308, otherwise, it proceeds to block 310. At block 380, the new external I/O requests are organized into an IRL and inserted into the task window prior to the reconstruction I/O request task window. It should be understood that one IRL list may include only external I/O requests, may include only reconstruction I/O requests, or may include both external I/O requests and reconstruction I/O requests, depending on the data block to which the I/O requests corresponds. At block 310, the I/O request tasks in the current task window are processed, and then the process proceeds to the next task window. At blocks 312 and 314, it is determined whether the task windows have all been processed, and whether all reconstruction I/O requests have been completed, respectively. When the determination of block 312 is "Yes", i.e., the TCL task lists in the current loop have all been processed, a new loop of populating a TCL is started. When the determination of block 314 is "Yes", all data blocks or stripes that need to be reconstructed have been reconstructed, and the process proceeds to block 316. At block 316, the TCL task list is destroyed, and memory space in the data storage system is freed up. It should be understood that by populating the TCL task list as described above, in each loop, it is possible to ensure that new external I/O requests are responded to as quickly as possible, while ensuring that internal reconstruction I/O requests are processed in a centralized manner, so that the head does not have to move back and forth multiple times between processing external I/O requests and internal reconstruction I/O requests.

Figure 4:
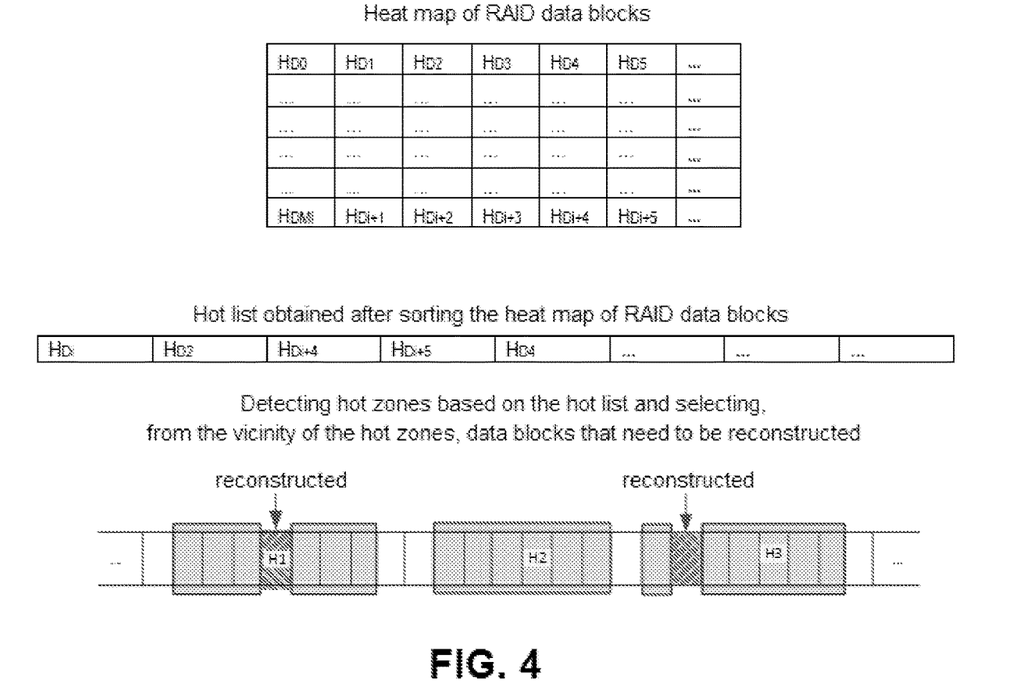
FIG. 4 illustrates a schematic diagram of a method for detecting hotspot zones and selecting, from the vicinity of the hotspot zones, data blocks that need to be reconstructed by calculating the heat values of RAID data blocks according to embodiments of the present disclosure.

The method for generating an IRL list will be described below in conjunction with FIG. 4. FIG. 4 illustrates a schematic diagram of a method for detecting hotspot zones and selecting, from the vicinity of the hotspot zones, data blocks that need to be reconstructed by calculating the heat values of RAID data blocks according to embodiments of the present disclosure. According to embodiments of the present disclosure, when there are a large number of external I/O requests, the technical solution of the present disclosure proposes a method for detecting hotspot zones and selecting, from the vicinity of the hotspot zones, data blocks that need to be reconstructed by calculating the heat values of the RAID data blocks, and furthermore, it organizes the I/O requests in the data blocks in the vicinity of the hotspot zone into the form of an IRL list.

In order to detect hotspots, it is first necessary to calculate the heat values of all RAID data blocks and store these heat values in a heat map as shown in FIG. 4, where the heat map is organized in the form of RAID stripes, in other words, each heat value in the heat map corresponds to a segment of a different stripe. For example, according to an embodiment, the heat value of each segment or data block can be calculated by Equation 1:

$$\begin{cases} H_{Di} = H_{Di} + (R*\alpha + W*\beta) \\ \alpha + \beta = 1 \quad (\alpha < \beta) \end{cases} \quad \text{Equation (1)}$$

where $H_{Di}$ denotes the heat value of data block Di, and its initial value is 0. R denotes the read hit value of data block Di in the sampling period, and W denotes the write hit value of data block Di in the sampling period. $\alpha$ denotes the weight value of the read hit of data block Di, and $\beta$ denotes the weight value of the write hit of data block Di. According to the above equation, $H_{Di}$ is equal to the sum of read hits and write hits in the sampling period $T_h$. When there are no read hits or write hits (i.e., no data read or data write requests) in a sampling period $T_h$, $H_{Di}$ decreases by 1. If there are no read hits and/or write hits for a long period of time, $H_{Di}$ can be reduced to 0 or even a negative number.

After calculating the heat map of the RAID data blocks, all the heat values in the heat map are sorted in a descending order to obtain the hot list shown in FIG. 4. Based on this hot list, hotspot zones can be selected, as higher heat values indicate more data read and write requests, i.e. more I/O requests. It should be understood that the heat map and hot list shown in FIG. 4 are illustrative only and do not reflect the true heat values of the data blocks in the RAID. It should also be understood that each heat value in the heat map and hot list shown in FIG. 4 is dynamically updated. It is assumed that the logical addresses can be expanded into a line, as shown in the lower part of FIG. 4. FIG. 4 schematically lists three detected hotspots, i.e., H1, H2, and H3. Generally, a variable step length (abbreviated as sl) is defined empirically before attempting to select candidate data blocks. In the example shown in FIG. 4, it is assumed that this variable step length sl=3, which means that from a currently detected hotspot, up to 3 data blocks preceding it and up to 3 data blocks following it can be selected, and these selected data blocks together with the currently detected hotspots form contiguous data blocks. For each hotspot, if a reconstructed data block is included in the selected contiguous data blocks, the reconstructed data block is ignored, which corresponds to the cases of H1 and H3 in FIG. 4. It should be understood that the reconstructed data blocks are marked as 0 in the reconstruction bitmap and the unreconstructed data blocks are marked as 1 in the reconstruction bitmap. If no unreconstructed data blocks are found in the above manner, which means that there are no data blocks in the selected contiguous data blocks that need to be reconstructed, this hotspot is ignored. After selecting contiguous data blocks in the above manner, the contiguous data blocks are organized in the form of an IRL list and then inserted into an appropriate task window. It should be understood that by selecting contiguous data blocks in the above manner or other suitable manner, it is possible to ensure that data blocks that need to be reconstructed are selected from the vicinity of hotspot zones, in other words, the technical solution of the present disclosure ensures that the head does not need to move to the position of the previous reconstruction, but rather to the hotspot zones calculated based on the disk landing zone of the current external I/O. The technical solution of the present disclosure can reduce the long distance movement of the head as much as possible, thus achieving the purpose of improving the overall performance of reconstruction.

Figure 5:
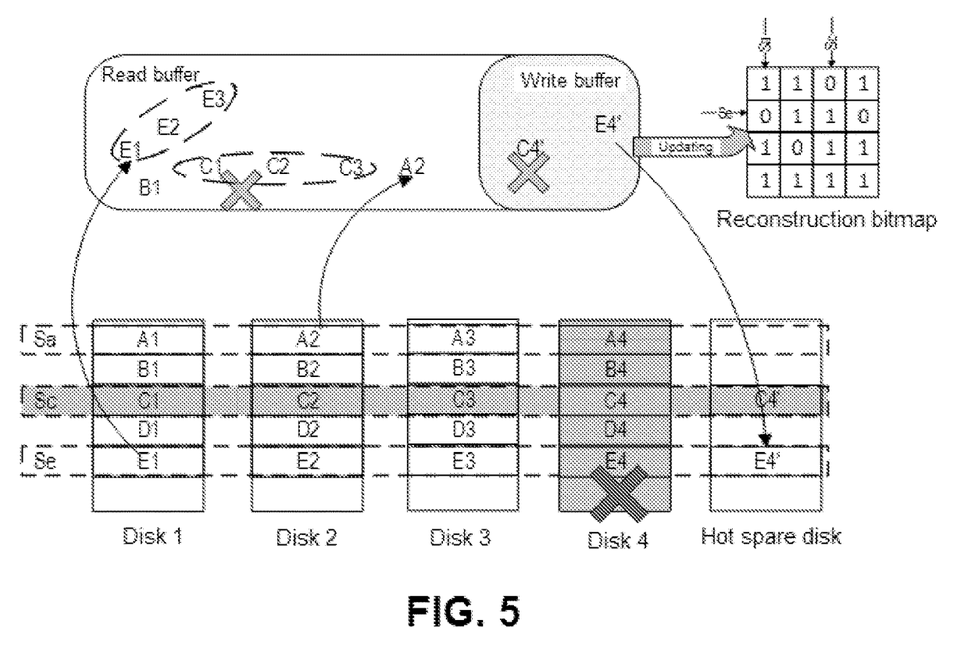
FIG. 5 illustrates a schematic diagram of a process for distributed multi-process reconstruction (DMPR) according to embodiments of the present disclosure.

FIG. 5 illustrates a schematic diagram of a process for distributed multi-process reconstruction (DMPR) according to embodiments of the present disclosure. It should be understood that in the technical solution herein, the method for distributed multi-process reconstruction is primarily used to execute a task in a window unit, i.e., an IRL list, in the TCL task list.

When external I/O requests are made simultaneously with internal reconstruction I/O requests, the I/O contention in each disk may be different, as evidenced by the fact that the response time may not be consistent across disks, for example. In this case, the disk with the slowest response represents the performance of the current reconstruction in the conventional stripe-based reconstruction method. The present disclosure proposes a new method for distributed multi-process reconstruction. This method provides better performance compared to the conventional stripe-based reconstruction method.

As shown in FIG. 5, the reconstruction process mainly involves (1) reading data from a stripe that needs to be reconstructed into a read buffer, (2) determining parity disk data (failed disk data) and storing it into a write buffer, and (3) flushing the data from the write buffer into the hot spare disk and updating the bit value for the stripe in the reconstruction bitmap. According to the principle of RAID, assuming that the number of data disks in a stripe is $N_d$ and the number of parity disks is $N_p$ (in this case, the RAID level is $N_d+N_p$), then one stripe only needs to read in data from $N_d$ disks, and we can then calculate data on the remaining $N_p$ other disks. Take RAID 5 as an example, $N_d=4$, $N_p=1$. The data in the 4 online disks (data disks) are read in asynchronously according to the data blocks provided by the IRL from the current task window of the TCL task list. When the computing process finds that the data in the 4 disks have been read into the read buffer, the computing process calculates the data in the fifth disk through XOR, and then that data is stored in the write buffer.

Referring again to FIG. 5, where three stripes Sa, Sc, and Se are schematically listed, assuming that the current IRL list contains data from these three stripes, then in the event of a cache miss, each read process reads the data of the corresponding stripe from each online disk to the read buffer asynchronously, and these data are organized in the form of stripes according to the address. As mentioned above, since the response time of each disk is not consistent, there is an order of completing reads of stripes in the read buffer. Assuming that stripe Sc is the first to complete the reads of the 4 online disks in the figure, the reconstruction calculation of stripe Sc will be processed first. Similarly, the operation of calculating the data of the failed disk and writing to the hot spare disk based on the reads of the online disks will also be completed first for stripe Sc, i.e., the reconstruction for stripe Sc will be completed first. It should be understood that, considering that the minimum read-in data that triggers the reconstruction of a stripe is the data of $N_d$ data disks, as soon as it is detected that $N_d$ data out of the data of a certain stripe have been read, the reconstruction process for that stripe is executed to reconstruct the corresponding failed disk data for that stripe. It should be understood that an IRL list can include one stripe (corresponding to one data block) or multiple stripes (corresponding to multiple data blocks). It should also be understood that the above distributed multi-process reconstruction process is for the purpose of accelerating the processing of each IRL list in the TCL task list, and compared with sequential processing of the IRL, this DMPR process can ensure that the data blocks that need to be reconstructed in the entire IRL list can be executed in parallel, thus greatly accelerating the efficiency of reconstruction of the stripes in the IRL.

Figure 6:
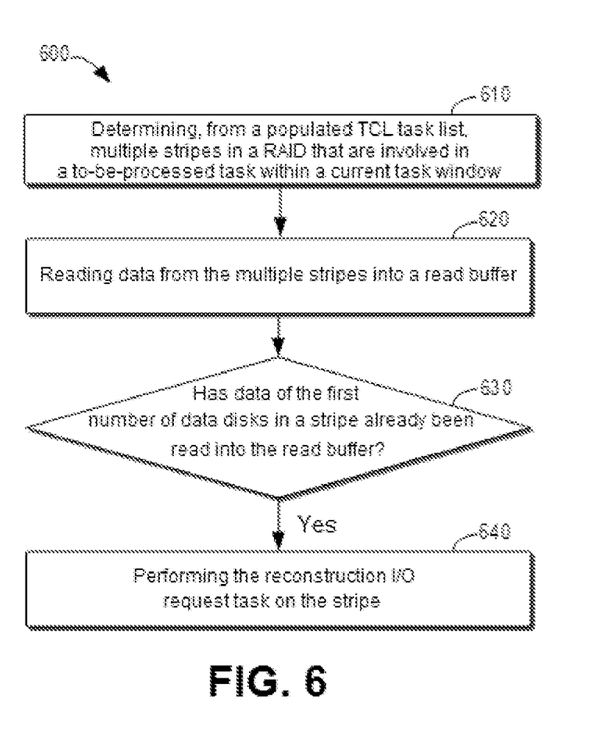
FIG. 6 illustrates a flow chart of method 600 for distributed multi-process reconstruction according to embodiments of the present disclosure.

FIG. 6 illustrates a flow chart of method 600 for distributed multi-process reconstruction according to embodiments of the present disclosure. As previously described, in the technical solution herein, the method for distributed multi-process reconstruction is primarily used to execute a task in a window unit, i.e., an IRL list, in the TCL task list.

At block 610, according to the TCL task list that has been created, multiple stripes in the RAID that are involved in the to-be-processed task within its current task window (an IRL list) are determined. At block 620, the data in the multiple stripes is read into the read buffer. Then, at block 630, it is determined whether one stripe among the multiple stripes has already had data of a first number of data disks read into the read buffer. It should be understood that in a given RAID level, this first number corresponds to the number $N_d$ of data disks in that RAID level, for example, in RAID 5, $N_d=4$. If the result of this determination indicates that the data of the first number of data disks have been read into the read buffer, the process proceeds to block 640. At block 640, a reconstruction I/O request task for this stripe is executed. By using the flow chart of the method shown in FIG. 6, the data blocks that need to be reconstructed in the current task window in the TCL task list can be quickly found. In addition, the data in the multiple stripes read in block 620 can also be read asynchronously into the read buffer, and by doing so, it can be ensured that multiple threads process that data read operation in parallel to effectively counteract the problem of inconsistent response times across disks.

It should be understood that the method for distributed multi-process reconstruction depicted in FIG. 5 and FIG. 6 combined with the process of populating a TCL task list depicted in FIG. 3 forms the basic framework of the technical solution of the present disclosure. Overall, by calculating the heat values of stripes or data blocks in RAID to find the hotspot zones where external I/O requests are most concentrated, and selecting, from the vicinity of the hotspot zones, the data blocks that need to be reconstructed, then arranging the I/O requests in the form of a TCL task list, and using the method for distributed multi-process reconstruction to accelerate the processing of each unit (IRL list) of the TCL task list, the technical solution of the present disclosure can achieve improved efficiency of reconstruction of the disk array while affecting the performance of the data storage system as little as possible, thereby ensuring the reliability and stability of the data storage system.

Figure 7:
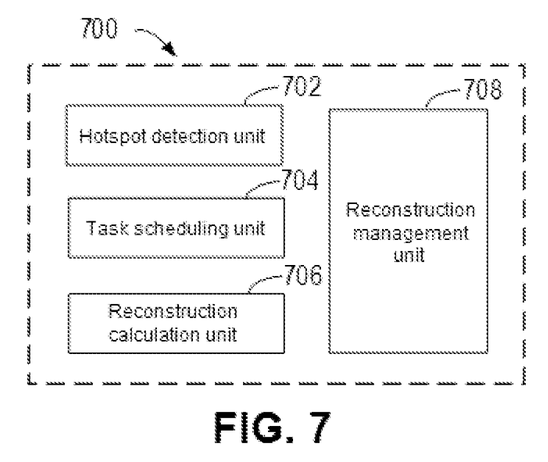
FIG. 7 illustrates an example structure diagram of device 800 for RAID reconstruction according to embodiments of the present disclosure.

FIG. 7 illustrates a example structure diagram of device 700 for RAID reconstruction according to embodiments of the present disclosure. Device 700 may be operable to perform method 300 described with reference to FIG. 3 and method 600 described in conjunction with FIG. 6, as well as any other processes and methods.

To this end, device 700 includes a hotspot detection unit 702 configured to periodically collect external read/write I/O requests for data blocks, calculate hotspot zones, and generate a hot list. Device 700 also includes task scheduling unit 704 configured to dynamically generate a TCL task list based on external I/O service levels, each unit in this TCL task list including tasks for processing internal reconstruction I/O requests and tasks for processing external I/O requests. This task scheduling unit 704 is also used to collect the IRL list for each reconstruction task window. Device 700 also includes a reconstruction calculation unit 706 configured to calculate the data of the failed disk corresponding to the stripe based on the data blocks that are read into the read buffer, and to store that data in the write buffer. Device 700 also includes a reconstruction management unit 708 configured to manage the detection of external I/O hotspot zones and control the distributed multi-process reconstruction process in a centralized manner. In addition, this reconstruction management unit 708 is further configured to manage the data blocks in the read buffer and write buffer, arrange them according to the layout of the RAID stripes, and provide an application programming interface to connect to the reconstruction bitmap in order to update the bit values for the reconstructed RAID stripe. It should be understood that this reconstruction management unit 708 can be inserted into an existing RAID reconstruction architecture as a plug-in or an external module.

Figure 8:
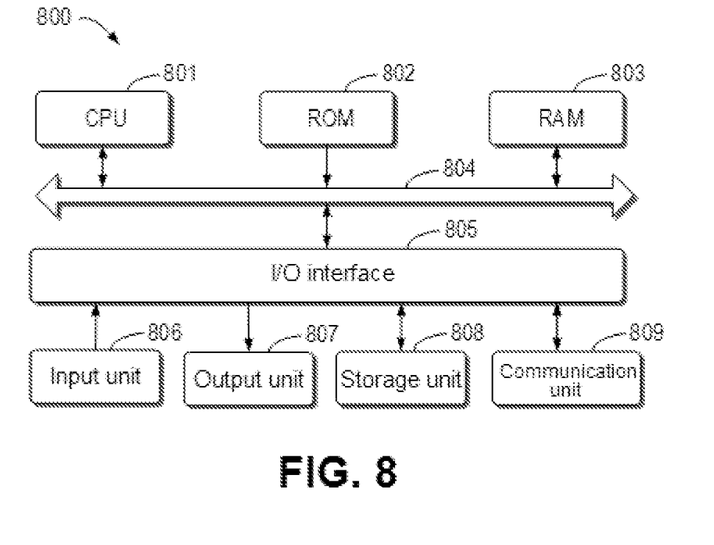
FIG. 8 illustrates a block diagram of example device 700 that can be used to implement embodiments of the present disclosure.

FIG. 8 illustrates a block diagram of example device 800 that can used to implement the embodiments of the present disclosure. Device 800 can be implemented as or included in device 700 of FIG. 7.

As shown in the figure, device 800 includes central processing unit (CPU) 801 that may execute various appropriate actions and processing according to computer program instructions stored in read-only memory (ROM) 802 or computer program instructions loaded from storage unit 808 into random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

Multiple components in device 800 are connected to I/O interface 805, including: input unit 806, such as a keyboard or a mouse; output unit 807, such as various types of displays and speakers; storage unit 808, such as a magnetic disk or an optical disc; and communication unit 809, such as a network card, a modem, or a wireless communication transceiver. Communication unit 809 allows device 800 to exchange information/data with other devices over a computer network such as an Internet and/or various telecommunication networks.

Processing unit 801 performs various methods and processing described above, for example, methods 300 and 600. For example, in some embodiments, methods 300 and 600 may be implemented as a computer software program or a computer program product that is tangibly contained in a machine-readable medium, such as a non-transitory computer-readable medium, for example, storage unit 808. In some embodiments, part or all of the computer program may be loaded and/or installed onto device 800 via ROM 802 and/or communication unit 809. When the computer program loaded to RAM 803 and executed by CPU 801, one or more steps of methods 300 and 600 described above may be performed. Alternatively, in other embodiments, CPU 801 may be configured in any other suitable manners (for example, by means of firmware) to perform methods 300 and 600.

Those skilled in the art should understand that the various steps of the method of the present disclosure described above may be implemented by means of a generic computing apparatus, and they may be concentrated on a single computing apparatus, or they may be distributed over a network constituted by multiple computing apparatuses;

alternatively, they may be implemented by program code executable by a computing apparatus, so that they may be stored in a storage apparatus and executed by the computing apparatus, or they may be separately made into individual integrated circuit modules, or a plurality of modules or steps among them may be made into a single integrated circuit module for implementation. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above can be embodied by further dividing the apparatus into multiple apparatuses.

The foregoing are optional embodiments of the present disclosure and are not intended to limit the present disclosure, and for those skilled in the art, the present disclosure is subject to various changes and variations. Any modifications, equivalent replacements, improvements, etc., made within the spirit and principles of the present disclosure shall be included in the scope of protection of this disclosure.

The invention claimed is:

1. A method for redundant array of independent disks (RAID) reconstruction, comprising:
   determining, from a task list, multiple stripes in a RAID that are involved in a to-be-processed task within a current task window, the task list including an external I/O request task and an internal reconstruction I/O request task, and each stripe including data on a first number of data disks and data on a second number of parity disks;
   reading data from the multiple stripes into a read buffer; and
   if data of the first number of data disks in a stripe among the multiple stripes has already been read into the read buffer, performing the internal reconstruction I/O request task on the stripe;
   wherein after the task list is initialized, to-be-processed tasks within task windows in the task list are executed in sequence; and
   wherein the method further comprises:
   destroying the task list if to-be-processed tasks within all task windows in the task list have been executed and the internal reconstruction I/O request task for the multiple stripes has been executed.

2. The method according to claim 1, wherein data in the multiple stripes is read asynchronously into the read buffer, and wherein performing the internal reconstruction I/O request task on the stripe comprises:
   writing data in the stripe that is related to a failed disk to a write buffer; and
   asynchronously flushing data in the write buffer that is related to the failed disk to a hot spare disk.

3. The method according to claim 2, further comprising:
   after the data in the stripe that is related to the failed disk has all been flushed to the hot spare disk,
      updating a relevant bit for the stripe in a reconstruction bitmap, and
      releasing all data of the stripe from the read buffer and the write buffer.

4. The method according to claim 1, further comprising:
   if the to-be-processed tasks within the task windows in the task list have not all been executed, in response to receiving a new external I/O request task, inserting the new external I/O request task before the internal reconstruction I/O request task.

5. The method according to claim 1, wherein the to-be-processed task within the current task window is determined by calculating heat values of the multiple stripes in the RAID.

6. The method according to claim 1, further comprising:
   receiving an external I/O request during RAID reconstruction, and
   inserting the external I/O request before the task windows to prioritize processing of the external I/O request over reconstruction I/O requests.

7. An electronic device, comprising:
   at least one processing unit; and
   at least one memory coupled to the at least one processing unit and storing instructions for execution by the at least one processing unit, wherein the instructions, when executed by the at least one processing unit, cause the electronic device to perform actions comprising:
      determining, from a task list, multiple stripes in a redundant array of independent disks (RAID) that are involved in a to-be-processed task within a current task window, the task list including an external I/O request task and an internal reconstruction I/O request task, and each stripe including data on a first number of data disks and data on a second number of parity disks;
      reading data from the multiple stripes into a read buffer; and
      if data of the first number of data disks in a stripe among the multiple stripes has already been read into the read buffer, performing the internal reconstruction I/O request task on the stripe;
   wherein after the task list is initialized, to-be-processed tasks within task windows in the task list are executed in sequence; and
   wherein the actions further comprise:
      destroying the task list if to-be-processed tasks within all task windows in the task list have been executed and the internal reconstruction I/O request task for the multiple stripes has been executed.

8. The electronic device according to claim 7, wherein data in the multiple stripes is read asynchronously into the read buffer, and wherein performing the internal reconstruction I/O request task on the stripe comprises:
   writing data in the stripe that is related to a failed disk to a write buffer; and
   asynchronously flushing data in the write buffer that is related to the failed disk to a hot spare disk.

9. The electronic device according to claim 8, wherein the actions further comprise:
   after the data in the stripe that is related to the failed disk has all been flushed to the hot spare disk,
      updating a relevant bit for the stripe in a reconstruction bitmap, and
      releasing all data of the stripe from the read buffer and the write buffer.

10. The electronic device according to claim 7, wherein the actions further comprise:
    if the to-be-processed tasks within the task windows in the task list have not all been executed, in response to receiving a new external I/O request task, inserting the new external I/O request task before the internal reconstruction I/O request task.

11. The electronic device according to claim 7, wherein the to-be-processed task within the current task window is determined by calculating heat values of the multiple stripes in the RAID.

12. The electronic device according to claim 7, wherein the actions further comprise:
receiving an external I/O request during RAID reconstruction, and
inserting the external I/O request before the task windows to prioritize processing of the external I/O request over reconstruction I/O requests.

13. A computer program product having a non-transitory computer readable medium which stores a set of instructions to perform redundant array of independent disks (RAID) reconstruction; the set of instructions, when carried out by computerized circuitry, causing the computerized circuitry to perform a method of:
determining, from a task list, multiple stripes in a RAID that are involved in a to-be-processed task within a current task window, the task list including an external I/O request task and an internal reconstruction I/O request task, and each stripe including data on a first number of data disks and data on a second number of parity disks;
reading data from the multiple stripes into a read buffer; and
if data of the first number of data disks in a stripe among the multiple stripes has already been read into the read buffer, performing the internal reconstruction I/O request task on the stripe;
wherein after the task list is initialized, to-be-processed tasks within task windows in the task list are executed in sequence; and
wherein the method further comprises:
destroying the task list if to-be-processed tasks within all task windows in the task list have been executed and the internal reconstruction I/O request task for the multiple stripes has been executed.

14. The computer program product according to claim 13, wherein data in the multiple stripes is read asynchronously into the read buffer, and wherein performing the internal reconstruction I/O request task on the stripe comprises:
writing data in the stripe that is related to a failed disk to a write buffer; and
asynchronously flushing data in the write buffer that is related to the failed disk to a hot spare disk.

15. The computer program product according to claim 14, wherein the method further comprises:
after the data in the stripe that is related to the failed disk has all been flushed to the hot spare disk,
updating a relevant bit for the stripe in a reconstruction bitmap, and
releasing all data of the stripe from the read buffer and the write buffer.

16. The computer program product according to claim 13, wherein the method further comprises:
if the to-be-processed tasks within the task windows in the task list have not all been executed, in response to receiving a new external I/O request task, inserting the new external I/O request task before the internal reconstruction I/O request task.

17. The computer program product according to claim 13, wherein the to-be-processed task within the current task window is determined by calculating heat values of the multiple stripes in the RAID.

18. The computer program product according to claim 13, wherein the method further comprises:
receiving an external I/O request during RAID reconstruction, and
inserting the external I/O request before the task windows to prioritize processing of the external I/O request over reconstruction I/O requests.

* * * * *